US006437053B1

(12) United States Patent
Reuschel

(10) Patent No.: US 6,437,053 B1
(45) Date of Patent: Aug. 20, 2002

(54) METHOD FOR PRODUCING THERMOPLASTIC SYNTHETIC MOULDING COMPOUNDS

(75) Inventor: Gerhard Reuschel, Liederbach (DE)

(73) Assignee: Ticona GmbH (DE)

(*) Notice: Subject to any disclaimer, the term of this patent is extended or adjusted under 35 U.S.C. 154(b) by 0 days.

(21) Appl. No.: 09/581,449

(22) PCT Filed: Dec. 9, 1998

(86) PCT No.: PCT/EP98/07996

§ 371 (c)(1),
(2), (4) Date: Jun. 13, 2000

(87) PCT Pub. No.: WO99/30893

PCT Pub. Date: Jun. 24, 1999

(30) Foreign Application Priority Data

Dec. 15, 1997 (DE) .......................................... 197 55 726

(51) Int. Cl.[7] .......................... C08L 61/02; C08L 59/02; C08L 67/00; C08L 77/00

(52) U.S. Cl. ...................... 525/398; 525/402; 525/432; 525/444; 525/403; 525/409

(58) Field of Search ................................ 525/398, 402, 525/432, 444, 403, 409

(56) References Cited

U.S. PATENT DOCUMENTS 4,181,685 A * 1/1980 Kern et al. .................. 525/402

* cited by examiner

*Primary Examiner*—Ana Woodward
(74) *Attorney, Agent, or Firm*—Connolly Bove Lodge & Hutz LLP

(57) ABSTRACT

A process for the continuous preparation of a thermoplastic molding composition with narrow scatter of the melt flow index, which comprises mixing two or more chemically identical starting materials of different melt flow index in a pelletizing extruder fitted with an on-line melt flow index meter and adjustable metering systems.

4 Claims, No Drawings

METHOD FOR PRODUCING THERMOPLASTIC SYNTHETIC MOULDING COMPOUNDS

The invention relates to a process for the preparation of a thermoplastic molding composition with narrow scatter of the melt flow index.

Thermoplastics are processed predominantly by injection molding or extrusion. In these methods, the material is melted, and the melt is forced continuously or discontinuously into molds, in which the material resolidifies. This allows very large numbers of identical moldings to be produced. However, it is a prerequisite for this type of processing that the polymer melt has a certain viscosity with the smallest possible variation, since variations in the melt viscosity within a material delivery intended for processing can result in break downs and an increased reject rate.

All producers of raw materials therefore offer their products in various melt viscosity grades. These products are in each case identical in chemical makeup and in the composition of the stabilizer and additive mixtures. The difference between the individual product grades is then exclusively the melt viscosity. Examples of this are indicated in the producers product brochures.

The measure of the melt viscosity that is usually indicated is the volume flow rate in accordance with ISO 1133 in ml/10 min. However, the mass flow rate in g/10 min is also often used.

In order to produce a defined melt flow index of a polymer, the mixture of one or more monomers and initiators is usually admixed, during polymer synthesis, with substances which result in chain growth termination and in turn initiate a new chain. The use of these substances, known as "regulators", allows the mean molar mass to be adjusted. However, this method is imprecise and gives products with considerable scatter in the melt viscosity. The melt flow index reproducibility which is necessary for commercial use of the polymer can only be achieved with considerable effort. In continuous polymer syntheses in particular, the effort needed to regulate the melt flow index is very high.

In the copolymerization of trioxane with cyclic ethers and cyclic acetals to give polyoxymethylene, low-molecular-weight, open-chain acetals, such as methylal or butylaln are usually used as regulators. In spite of the use of these substances, the resultant products exhibit, however, considerable variation in the melt flow index. However, variations in the melt flow index can, as mentioned above, result in production problems during processing of the material by injection molding or extrusion. In order to reduce the scatter in the melt flow index, homogenization devices are therefore usually used after granulation. In this additional processing step, material is mixed until low scatter of the melt flow index has been achieved over the entire product volume. However, this additional effort is associated with considerable costs.

Mixtures of polyoxymethylene components of high and low melt flow index which have improved flow properties are known (JP-A-50-030 949 and JP-A-05-279 551). These can be homopolymers or copolymers. However, each of the examples indicates only the resultant melt flow index of a mixture prepared discontinuously, i.e. batchwise; the range of variation in the values for mixtures prepared repeatedly cannot be derived from the prior art. There was therefore a need to avoid the disadvantages of the prior art.

The object has been achieved by a continuous process for the preparation of a thermoplastic molding composition with low scatter of the melt flow index, in which two or more chemically identical starting materials of different melt flow index are mixed in a pelletizing extruder equipped with an on-line melt flow index meter and adjustable metering systems.

Suitable thermoplastic molding compositions for use in the process of the invention are known homopolymers and copolymers of polyoxymethylene (POM), polyesters, such as polyethylene terephthalate and polybutylene terephthalate, and polyamide, preferably POM.

The process of the invention allows the melt flow index of, for example, linear POM polymers to be set significantly more accurately than is the case in the synthesis of the monomers using regulators. Neither do the mechanical properties of the products prepared by mixing in accordance with the invention differ from the properties of the products of the same melt flow index prepared by synthesis using regulators. However, the mixing process of the invention, starting from two or more products of different melt flow index, allows any melt flow index value between the starting values to be produced within narrow limits by varying the respective proportions by weight.

This process is highly suitable for automation and for large-scale production. For this purpose, the pelletizing extruder is equipped with an on-line melt flow index meter and adjustable metering systems, in each case known pieces of equipment. Manufacturers of suitable on-line meters are Gottfert, Buchen, Germany, and Reametrix, German subsidiary, Frankfurt am Main, Germany. Suitable metering systems can be purchased, for example, from Engelhart, Germany, or K-tron-Soder, Switzerland. Electronic regulators which can be used are, for example, Sipart DR 22, Siemens AG, Karlsruhe, Germany. The melt flow index meter measurement signal, which has the value of the target product, controls the metering of the material streams of the individual components in such a way that the measurement signal remains constant at the specified target value. This allows the preparation of products which, as stated above, have only minimal variations within either the individual batches or in continuous operation. In addition, it is possible to produce any desired melt flow indices for specific applications in a targeted manner and with low scatter of the flow behavior. The melt flow indices of the starting substances used for the mixture can vary within broad limits. The dispensation with complex, accurate melt flow index regulation that this allows during the polymer synthesis enables considerable cost savings to be made in the provision of the starting substances for preparation of the end product.

The products obtained in accordance with the invention can be processed without problems, since the properties do not change compared with products prepared in a conventional manner. It is advantageous that no variations occur in the melt viscosities and consequently no breakdowns or rejects are observed in processing by injection molding or extrusion.

EXAMPLES

1) Two commercially available polyacetal molding compositions having the melt flow indices 9 g/10 min and 13 g/10 min were fed continuously to the extruder using an on-line meter, electronic regulator and sand balances in such a way that the on-line measurement signal, set at 9.50 g/10 min, remained constant. The scatter in the melt flow index of the resultant mixture was 0.05 g/10 min with an average value of 9.50 g/10 min.

COMPARATIVE EXAMPLE 1

Commercially available polyacetal having a melt flow index of 9 g/10 min was measured 10 times. The scatter in the measurement values was 0.5 g/10 min with an average value of 9.50 g/10 min.

2) As in Example 1, a molding composition was prepared with a melt flow index of 28 g/10 min. The melt flow indices of the starting materials were 2.5 g/10 min and 52 g/10 min. The scatter in the melt flow index of the resultant mixture was 0.12 g/10 min.

COMPARATIVE EXAMPLE 2

Commercially available polyacetal having a melt flow index of 28 g/10 min was measured 10 times. The scatter in the measurement values was 0.8 g/10 min with an average value of 28 g/10 min.

What is claimed is:

1. A process for the continuous preparation of a thermoplastic molding composition, which comprises mixing two or more chemically identical starting materials of different melt flow index in a pelletizing extruder fitted with an on-line melt flow index meter and adjustable metering systems.

2. The process as claimed in claim 1, wherein the melt flow index meter emits a measurement signal through which the metering of the material streams of the individual components is controlled.

3. The process as claimed in claim 2, wherein the measurement signal is set to a value of a target product.

4. The process as claimed in claim 1, wherein the thermoplastic molding composition used is polyoxymethylene.

* * * * *